Jan. 29, 1957 — M. DRODOFSKY — 2,779,231
DEVICE FOR DETERMINING SMALL INCLINATIONS
FROM THE VERTICAL OR HORIZONTAL
Filed Nov. 9, 1950 — 2 Sheets-Sheet 1
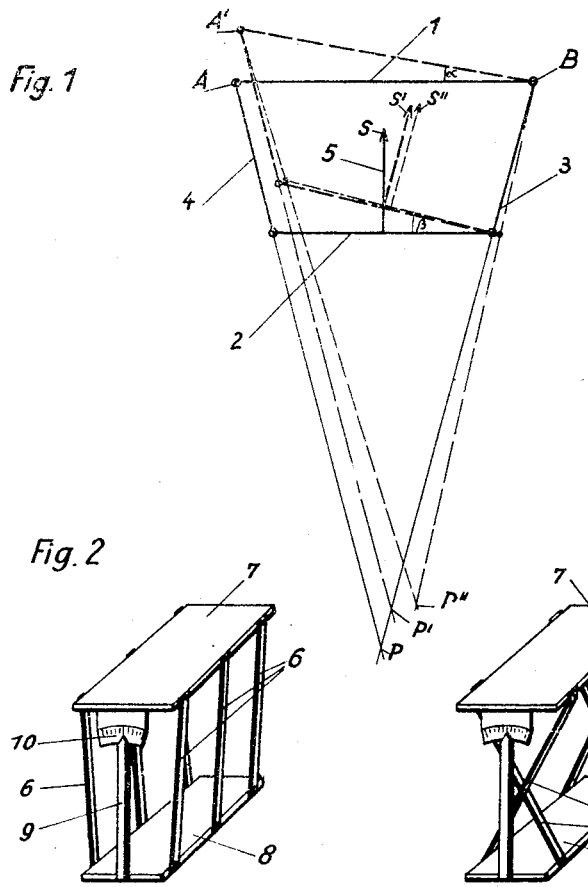
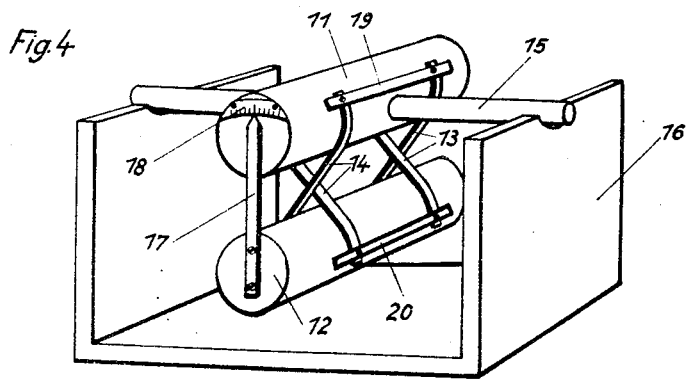
Inventor:
Martin Drodofsky

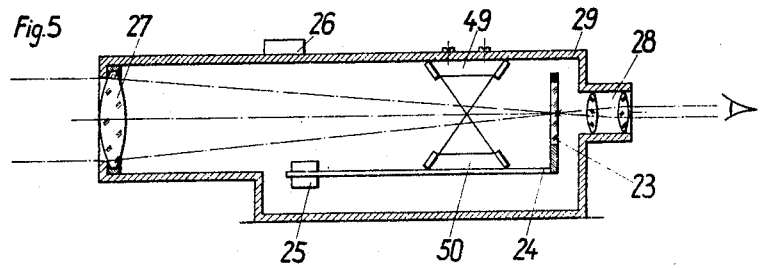
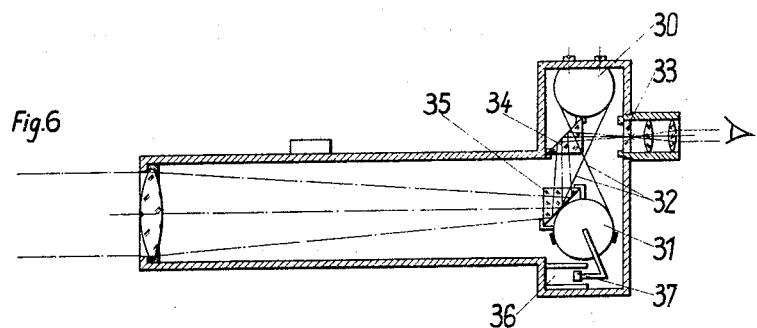
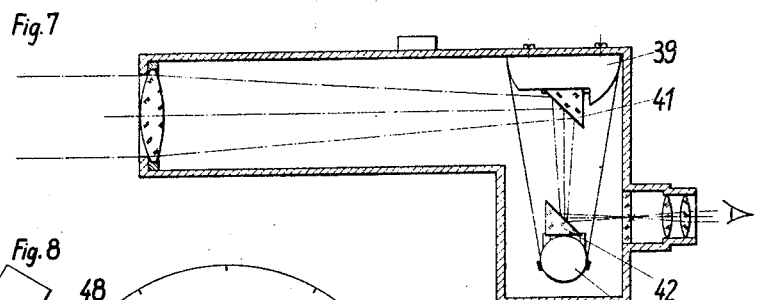
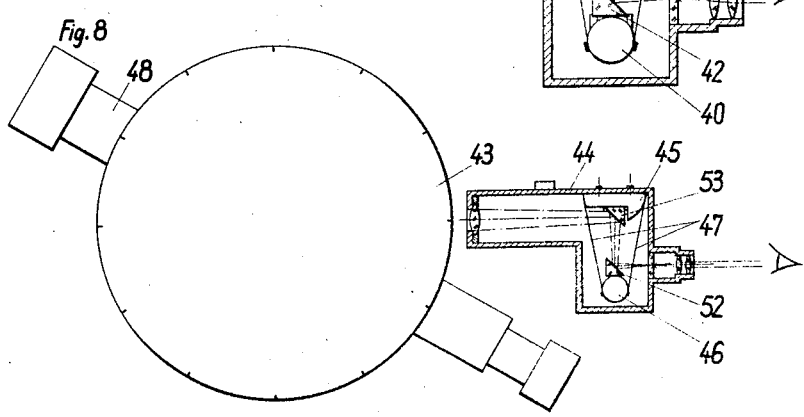

2,779,231

United States Patent Office

Patented Jan. 29, 1957

2,779,231

DEVICE FOR DETERMINING SMALL INCLINATIONS FROM THE VERTICAL OR HORIZONTAL

Martin Drodofsky, Heidenheim (Brenz), Germany, assignor to Carl Zeiss, Heidenheim (Brenz), Germany Application November 9, 1950, Serial No. 194,747

Claims priority, application Germany November 9, 1949

4 Claims. (Cl. 88—2.4)

As a rule, the horizontal or vertical position of instruments are determined by means of levels, which, however, have the disadvantage of being subjected to relatively large disturbances from even small differences in temperature, and moreover do not admit of automatically compensating for inclinations of the instrument. Other devices which have been used for this purpose are pendulum balances, ordinarily fitted with target marks or a diopter; but these pendulum devices as ordinarily made are inaccurate and nonsensitive.

The object of the present invention is a device for determining minute inclinations from the horizontal or vertical with the aid of a pendulum balance which differs from hitherto used arrangements of this kind by its extraordinarily high sensitivity and precision. In accordance with the invention, this balance is in the form of an articulated quadrilateral whose fixed member serves as a tilting body while its coupling member acts as a pendulum body. These two bodies are connected with each other by the so-called links or suspension members, which are either rigid in themselves or, preferably, are non-rigid (formed by tapes or wires).

In a pendulum balance of this type, the pendulum body performs, in addition to a pure swinging motion, also a rotative movement, viz. a rotation around the so-called momentary pole. This momentary pole is located at that point where the two suspension links or their continuations intersect each other. Thus, when the tilting body is inclined by a slight amount and the pendulum body assumes a new position of equilibrium, it is at the same time subjected to a rotation, the angle of which depends upon the angle which the tilting body occupies in its new position relative to the horizontal. With this arrangement, the pendulum permits an enlargement of the angle of rotation of the pendulum body relatively to the angle of inclination of the tilting body, the magnitude of this enlargement thereby depending upon the dimensions of the several components of the articulated quadrilateral.

In order to prevent the pendulum from twisting, it is advisable to connect the tilting body and the pendulum body by at least three links lying in different planes. One good way is to employ two pairs of links arranged in two different planes. In many cases, however, three links can be used to advantage, in which case one of the links lies in another plane from that of the two other links.

According to another thought of the invention, when using at least three links they are arranged so as to form the edges of a pyramid. In this case, the pendulum body is free to swing preferably in planes perpendicular to each other, so that inclinations in all directions can be determined or compensated. The ratio of enlargement as between the tilting body and the pendulum body may in this case be different in the two planes of movement.

In a form of the invention which is frequently of particular advantage, the pendulum consists of two rolls connected by ribbons. Such arrangement permits the device to be used for large angles of inclination in addition to high enlargement of these angles.

The invention may be used wherever either spirit levels or pendulum balances etc. have heretofore been employed for determining the exact vertical position. It is moreover suitable and particularly advantageous for automatically adjusting a line of sight. To this end, in accordance with a further thought of the invention, the displacement of the line of sight which has been caused by an inclination of the instrument, is neutralized by the articulated quadrilateral pendulum. For this purpose, the pendulum balance may be built into an optical instrument such as a telescope or microscope, in which the eyepiece reticule, for instance, is directly fixed to the pendulum body. In other cases it may be of advantage to attach to the pendulum body a mirror, reflecting prism, or plane-parallel glass plate, and by the aid of these elements to influence the path of rays of the telescope when the latter is inclined. Similarly, the setting of the elevation index may be caused to take place automatically in elevation angle measuring instruments equipped with a reading microscope.

Another kind of stabilization is to cause the motions of the pendulum body to influence electric circuits in an amplifier and to have these circuits produce a displacement of the entire apparatus by way of a relay or similar device. This may be of value, for instance, in nautical elevation angle measuring devices (sextants).

The invention is of particular advantage in astronomical, nautical and geodetic instruments of all kinds such as astrolabes, shaft plumbing devices, levels, theodolites, tachymeters, sextants, and the like.

The invention shall now be explained in more detail by the examples of design shown in Figs. 1 to 8 of the drawing and the following description. At the same time, some further characteristics of the invention are pointed out.

In the drawing:

Fig. 1 illustrates diagrammatically the principle of the pendulum balance of the present invention.

Fig. 2 illustrates a mechanical embodiment of the pendulum balance.

Fig. 3 illustrates a modification of the mechanical embodiment shown in Fig. 2.

Fig. 4 illustrates another construction of a mechanical embodiment of the pendulum balance of the present invention.

Fig. 5 illustrates an optical instrument, namely a telescope having incorporated therein a pendulum balance for automatically adjusting the reticle in the line of sight of the instrument.

Fig. 6 illustrates another embodiment of a pendulum balance mounted into a telescope of different construction.

Fig. 7 illustrates a modification of the arrangement shown in Fig. 6, and

Fig. 8 illustrates the instrument shown in Fig. 7 when used with a microscope.

Fig. 1 is a schematic sketch of a pendulum balance in the form of an articulated quadrilateral. 1 is the base member of the articulated quadrilateral, the member 1 in the present case representing the tilting body and is rigidly connected to the object whose inclination is to be determined. It may, however, form directly a part of this object. The coupling member 2 of the articulated quadrilateral, according to the invention, serves as a pendulum body. The two members 1 and 2 are movably articulatedly connected together by suspension members or links 3 and 4, which in this case are rigid members. Fixed to the pendulum body is pointer 5 which plays over a scale (not shown) so as to indicate the angle by which the pendulum body 2 is turned by the inclination of the base member 1. The center of gravity of the pendulum body may be assumed as being located at point S, if the connecting links 3 and 4 be imagined to have no mass.

Irrespective of the prevailing inclination of the pendulum body, the pendulum is always in equilibrium when a vertical line from the center of gravity S of pendulum body 2 passes through the point of intersections P (momentary pole) of the two links 3 and 4, or—as in the illustration—of their continuations. When the pendulum swings around this position of equilibrium, the pendulum body does not remain parallel to itself but suffers a rotation around momentary pole P. It must, however, be considered that also this point P and the center of gravity S move during the swinging movement, and both in the same direction. The position of equilibrium is stable when, with a small swinging movement and in the same time interval, point P moves through a greater amount than the center of gravity S; or when, in other words, the rate of traverse of point P exceeds that of point S. This is so because, in this case, center of gravity S generates a moment of rotation which always returns the pendulum to its balanced position. The equilibrium is indifferent when S and P travel by equal amounts relatively to the perpendicular in the same length of time; and it is labile if, in the swinging movement, the center of gravity S is displaced by a greater distance than point P. In this latter case, the whole arrangement tips over. Which of the conditions of equilibrium exist, will depend upon the position of the center of gravity S. The higher this point S is situated above the joint centers on the pendulum body, the more the arrangement approaches indifferent equilibrium, until it finally becomes labile.

The pendulum according to the invention is preferably used in a stable position of equilibrium which approaches more or less the condition of indifferent equilibrium, in accordance with the desired precision and sensitivity.

In order to illustrate the principle of the pendulum as an instrument reacting to inclinations, let it be assumed in Fig. 1 that the base member 1 is inclined by raising joint A to A' while point B and, also for the present, link 3 are held against movement. In the drawing, the proportions are purposely exaggerated for the sake of a better understanding of the invention. In practice, the pendulum represented is used only for very much smaller angles of inclination. Let it further be assumed that as a result of the inclination, the various elements of the pendulum assume the position indicated by the heavy dash lines. Center of gravity S is now no longer vertically above point P, which latter has been displaced to P', but is a little farther to the right, at S'. It thereby causes a clockwise moment of rotation, which when link 3 is released, produces a swinging movement. This movement starts with a travel of the pendulum member as well as of the center of gravity S' and of point P' farther towards the right.

Since the arrangement is such that stable equilibrium exists, point P' moves faster than point S' as above explained, and finally comes up to this point at a certain rotation of the pendulum body. In this position S'' and P'' both points are again vertically above one another. If the swinging movement is stopped, as for instance by a damper, then the pendulum remains at rest in this position, which is the new position of equilibrium. The parts 2, 3, 4, and 5 now occupy the light-dash line position. Pendulum body 2 has been inclined from its original position by an angle β, which is greater than the angle of inclination α of the base member 1. This enlargement will be the greater, the larger is the proportion between the lengths of base member 1 and pendulum member 2, and the smaller is the difference in the rate of displacement of points S and P in swinging around the position of equilibrium, as with small differences in the rate of travel, point P demands a large stretch—and therewith a corresponding large rotation of the pendulum body—to come up with point S. This difference in the rate of travel will be the smaller, the higher is the position of the center of gravity S, i. e. the more the arrangement, which is in stable equilibrium, approaches indifferent equilibrium.

By suitably dimensioning the various members of the articulated quadrilateral and by a proper choice of the position of the center of gravity, the desired enlargement of the angle of inclination of body 1 can be attained on pendulum body 2. In this manner, readable deflections can be indicated on the scale of pointer 2' with very slight angles of inclination α. The scale can be graduated in angles α. It goes without saying, however, that the arrangement may also be used without a scale, if it is to serve only for horizontalization in the manner of a spirit level. Over the spirit level, it has the advantage of considerably higher precision and sensitivity. It goes without saying that enlargement ratios smaller than one can also be obtained.

By applying sighting marks to the tilting body, the pendulum is converted into a simple but accurate spotting balance.

The joints whereby the links 3 and 4 are connected to the tilting and pendulum bodies, may be of any of various well known types, but should be subject to the least possible friction in order not to depreciate the precision. In this respect, links consisting of thin ribbon or wire have proved particularly well suited. It is of advantage to construct the links of ribbons or wires only. In this case, however, there exists a risk that the articulated quadrilateral is twisted and its precision thereby reduced. By using more than two links this disadvantage can be avoided. Fig. 2 is a perspective and schematic sketch of such a design in which three pairs of links connecting the tilting and pendulum bodies 7 and 8 are provided. The pendulum body is fitted with an index 9 working over a scale 10 on tilting body 7. There are indicated inclinations around an axis at right angles to the plane of the swinging movement. In the particular design shown, the planes formed by the several pairs of links are parallel to each other and congruent. If, for instance, only two pairs of links are used and are so arranged that the planes of these two pairs are inclined towards ecah other, or in other words, that the links form the edges of a four-sided pyramid, then the pendulum body can swing in two planes perpendicular to each other, in which case determination of the vertical direction will be facilitated in many cases.

The links or linking ribbons may also be placed crossing each other, in the way indicated in Fig. 3 on a pendulum with two linking ribbon pairs 6. The intersection of these links, i. e. the momentary pole, then lies between tilting body 7 and pendulum body 8, and the sense of rotation of the pendulum body receives the opposite sign from that of the tilting body. Otherwise the mode of action is the same as that described in connection with Figs. 1 and 2. The arrangement will also work with but three links without danger of twisting if, e. g. as in Fig. 3, the two parallel inner links are shifted towards each other until they are fused into a single link.

Fig. 4 shows an advantageous design in the form of a roll ribbon pendulum, which is again suitable for indicating inclinations from the vertical or from the horizontal (instead of a spirit level). The tilting and pendulum bodies consist of rolls 11 and 12, interconnected by two pairs of ribbon links 13 and 14. Tilting body 11 is fitted with a shaft 15 the axis of which is perpendicular to that of body 11 and is seated by this shaft on the instrument 16 of which it is intended to ascertain or compensate the inclination. By this means, it is made sure that inclination of the instrument in a plane at right angles to the plane of swing of the pendulum will not cause shearing of the ribbons 13 and 14. The instrument thus indicates noninfluenced tilts around axes positioned at right angles to the plane of swing of the pendulum. The pendulum body 12 carries an index 17 ranging over a scale 18 fast to the tilting body. In the present case, the tilting and pendulum bodies are practically of equal diameter, so that the enlargement of the angle of inclination to the pendent is not effected geometrically by the transmission to the pendulum body, but purely physically by the position of the center of gravity of pendulum body 12. Because of the location of the index, this center of gravity here lies above the axis of pendulum body 12.

The position of the attachment straps 19 and 20 for the link ribbons 13 and 14 on the circumference of the tilting and pendulum bodies will depend upon the desired range of rotation. The roll-shaped bodies permit relatively large angles of inclination of body 11, and correspondingly large angles of deflection of pendulum body 12, and therewith also higher enlargements. The angles of deflection of the pendulum body are linearly dependent upon the inclination of body 11 as long as their sine can be assumed as being equal to the arc. While large inclinations can easily be obtained, the pertinent relations will then be no longer linear.

Frequently it will be of advantage so to fasten the link ribbons as to cause them not to engage the roller shaped bodies over their entire range of action. In such cases, it will be best to depart from the roll shape of the tilting and pendulum bodies. An arrangement of this kind is schematically illustrated in a section in Fig. 5, which shows a telescope with a self-stabilizing sighting line. The telescope includes a housing 29 having an objective 27 and an eyepiece 28, and can be pre-leveled e. g. with the aid of a box bubble 26. Fine setting and the compensation of slight fluctuations in tilt are effected by an articulated quadrilateral pendulum arranged in the interior of the telescope. It consists of the tiltable body 49 fixed to the wall of the telescope, and of the pendulum body 50, the two parts being connected by crossed link ribbons 51. In this case again, two pairs of such link ribbons in parallel planes are provided, the second pair of which being situated behind that represented and therefore not visible. The ribbons are attached by means of flanges 21 and 22 terminating with the bodies 49 and 50, this causing the portions of the ribbons 51 between the joints to be freely positioned in air. Fixedly attached to the pendulum is a longitudinal bar 24 carrying at one end at right angles to its axis a reticule 23 located in the path of rays. To compensate the weight of the reticule, a counterweight 25 is provided at the other end of the bar 24. The arrangement is so adjusted that fluctuations in the inclination of the telescope within a certain range are compensated by a shift of the reticule 23 connected with the pendulum, so that the sighting line of the telescope always remains in its adjusted position.

Fig. 6 illustrates another similar arrangement on a telescope. The tilting body 30 and pendulum body 31 are here in the form of rollers, and are again interconnected by two pairs of crossing link ribbons 32. The reticule 33 is fixed in this case, the sighting line, however being deflected behind the telescope by the pendulum arrangement. To this end, the tilting body, which is fixed to the barrel or body of the telescope, carries a reflecting prism 34 and the pendulum body 31 a reflecting prism 35. Adjustment is again such as to cause changes in the inclination of the telescope within a certain range to be neutralized. In order to speed up setting the sighting line in the new position of the telescope, the swinging motion of the pendulum is damped. For this purpose a cylinder 36 is provided within which moves a piston 37 connected with pendulum body 31. Such or similar damper arrangements are also used to advantage with the previously described designs.

Fig. 7 shows a telescope in which the link ribbons 38 are attached to tilting body 39 and pendulum body 40 without being crossed. Also in this case suitably two pairs of link ribbons are provided. The tilting and pendulum bodies are again in the form of rolls or portions of rolls. Each body carries a reflecting prism 41 and 42, respectively. Tilting body 39 is recessed as required for the reception of prism 41. When the equilibrium position of pendulum body 40 changes, prism 42 causes a deflection of the ray as in the previous examples, so that any inclinations of the telescope with respect to the desired position are compensated. Whether the ribbons are to be crossed or not crossed will depend upon the desired sense of deflection. This again will frequently be governed by the kind of the optical arrangement, as for instance by the number of reflecting surfaces in the telescope, etc.

The invention may also be employed for stabilizing the sighting or reading direction of microscopes, as for automatically maintaining the position of the elevation index in elevation measuring instruments. Fig. 8 illustrates such an arrangement. The vertical circle 43 connected with elevation angle telescope 48 is read with the aid of microscope 44. The microscope again contains a pendulum consisting of a roll-shaped tilting body 45 and pendulum body 46 connected by two pairs of links 47 (of which but one is shown). The tilting and pendulum bodies are again fitted with reflecting prisms, to which end the tilting body again is recessed for the reception of prism 53. The working principle is the same as in the preceding arrangements.

I claim:

1. A telescope for sighting objects along a level optical line of sight comprising an objective, a reticle and an optical element for bending the optical line of sight, a housing for said objective, reticle and optical element for bending the optical line of sight, a pendulum body also within said housing and carrying said optical element for bending the optical line of sight, means supporting said pendulum body for rotation inside said housing including two links articulatably attached at spaced points fixed with respect to said housing and articulatably attached at spaced points to said pendulum body forming an articulated quadrilateral in a plane perpendicular to the axes about which the housing and pendulum body rotate and parallel to the vertical plane containing the optical line of sight, the planes containing said links and which are parallel to the axes about which the housing and pendulum body rotate intersecting at a line containing the momentary pole of rotation of the pendulum body, whereby slight variations in the inclination of said housing are compensated to keep the optical line of sight level, and an eyepiece for viewing said reticle and objects imaged thereon.

2. A telescope for sighting objects along a level optical line of sight comprising an objective and a reticle, a housing for said objective and reticle, a pendulum body also within said housing and carrying said reticle, means supporting said pendulum body for rotation inside said housing including two links articulatably attached at spaced points fixed with respect to said housing and articulatably attached at spaced points to said pendulum body forming an articulated quadrilateral in a plane perpendicular to the axes about which the housing and pendulum body rotate and parallel to the vertical plane containing the optical line of sight, said rotation of said pendulum body causing a translation of said reticle in the direction perpendicular to the optical line of sight and in the plane including the optical line of sight and perpendicular to the axes about which said housing and pendulum body rotate, the planes containing said links and which are parallel to the axes about which the housing and pendulum body rotate intersecting at a line containing the momentary pole of rotation of the pendulum body, whereby slight variations in the inclination of said housing are compensated to keep the optical line of sight level, and an eyepiece for viewing said reticle and objects imaged thereon.

3. A telescope for sighting objects along a level optical line of sight comprising an objective, a reticle and a reflecting element for bending the optical line of sight, a housing for said objective, reticle and reflecting element for bending the optical line of sight, a pendulum body also within said housing and carrying said reflecting element for bending the optical line of sight, means supporting said pendulum body for rotation inside said housing including at least three links articulatably attached at spaced points fixed with respect to said housing and articulatably attached at spaced points to said pendulum body forming an articulated quadrilateral in a plane perpendicular to the axes about which the housing and pendulum body rotate and parallel to the vertical plane containing the optical line of sight, all of said links falling into two planes, the said two planes containing said links and which are parallel to the axes about which the housing and pendulum body rotate intersecting at a line containing the momentary pole of rotation of the pendulum body, whereby slight variations in the inclination of said housing are compensated to keep the optical line of sight level, and an eyepiece for viewing said reticle and objects imaged thereon.

4. A telescope for sighting objects along a level optical line of sight comprising an objective, a reticle and a compensator, a generally tubular housing supporting said compensator between said objective and reticle and nearer said reticle than said objective, said compensator including a fixed portion secured to said housing and carrying a fixed reflecting element for bending the optical line of sight, said compensator also including a pendulum body carrying a movable reflecting element for bending the optical line of sight, light passing through said objective being bent toward said movable reflecting element by said fixed reflecting element and subsequently reaching said reticle after being bent by said movable reflecting element, four wires of substantially equal length supporting said pendulum body for rotation with respect to the fixed portion of said compensator, said wires being attached at spaced points to said fixed portion and attached at spaced points to said pendulum body, thereby forming an articulated quadrilateral in a plane perpendicular to the axes about which the housing and pendulum body rotate and parallel to the vertical plane containing the optical line of sight, the center of gravity of the pendulum body being located above the lines joining the spaced points on the pendulum body, a damping means for said pendulum body, all of said wires falling into two planes, the said two planes containing said wires and which are parallel to the axes about which the housing and pendulum body rotate intersecting at a line containing the momentary pole of rotation of the pendulum body, whereby slight variations in the inclination of said housing are compensated to keep the optical line of sight level, a rough leveling device for preleveling said telescope to approximately the desired position, and an eyepiece for viewing said reticle and objects imaged thereon.

References Cited in the file of this patent
UNITED STATES PATENTS

| Number | Name | Date |
|---|---|---|
| 660,870 | Sinkovic | Oct. 30, 1900 |
| 811,777 | Konig | Feb. 6, 1906 |
| 837,315 | Marshall | Dec. 4, 1906 |
| 1,110,347 | Roberts | Sept. 15, 1914 |
| 1,689,624 | Eskilson et al. | Oct. 30, 1928 |
| 1,888,976 | Blau | Nov. 29, 1932 |
| 1,927,150 | Berroth | Sept. 19, 1933 |
| 2,101,837 | Blanchett | Dec. 14, 1937 |
| 2,125,282 | Brown | Aug. 2, 1938 |
| 2,210,970 | Bonell | Aug. 13, 1940 |
| 2,255,876 | Clewell | Sept. 16, 1941 |
| 2,317,028 | Chappel | Apr. 20, 1943 |
| 2,362,135 | James | Nov. 7, 1944 |

FOREIGN PATENTS

| Number | Country | Date |
|---|---|---|
| 83,896 | Switzerland | Of 1920 |
| 13,035 | Great Britain | Of 1897 |
| 599,955 | Great Britain | Mar. 24, 1948 |